H. A. ALLEN.
GEAR.
APPLICATION FILED NOV. 6, 1916.

1,287,814.

Patented Dec. 17, 1918.
2 SHEETS—SHEET 1.

Inventor.
Henry A. Allen,
By Chas. E. Lord
Atty.

H. A. ALLEN.
GEAR.
APPLICATION FILED NOV. 6, 1916.
1,287,814.
Patented Dec. 17, 1918.
2 SHEETS—SHEET 2.
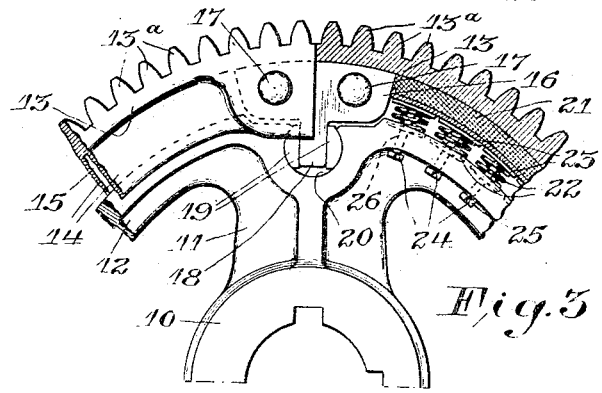
Fig.3
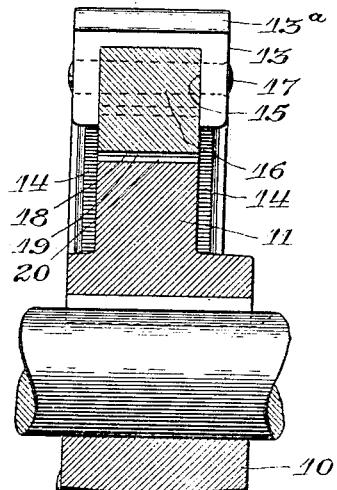
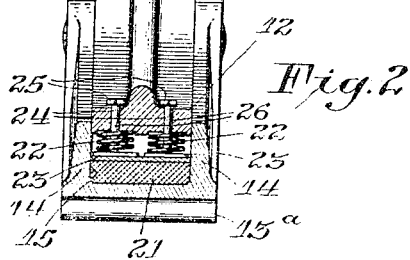
Fig.2
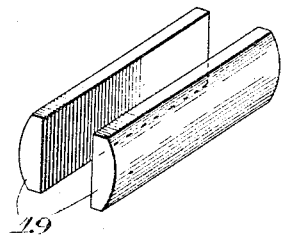
Fig.4
Fig.6.
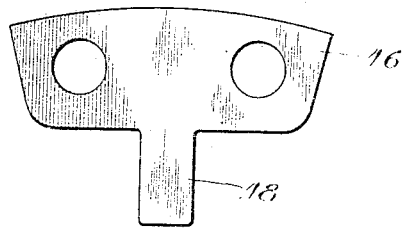
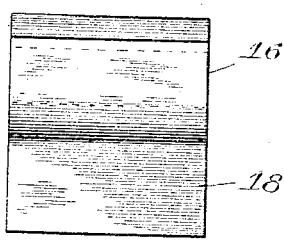
Fig.5.
Inventor.
Henry A. Allen,
By Chas. E. Lord,
Atty.

UNITED STATES PATENT OFFICE.

HENRY A. ALLEN, OF CHICAGO, ILLINOIS.

GEAR.

1,287,814.

Specification of Letters Patent. Patented Dec. 17, 1918.

Application filed November 6, 1916. Serial No. 129,801.

*To all whom it may concern:*

Be it known that I, HENRY A. ALLEN, a citizen of the United States, residing at Chicago, in the county of Cook and State of Illinois, have invented certain new and useful Improvements in Gears, of which the following is a full, clear, and exact specification.

My invention relates to gears for transmitting power, and particularly to gears of the type in which the toothed or ring portion is separated from and movable relatively to the body portion.

Gears of this type are useful in many kinds of machinery for transmitting heavy loads, but are especially useful in machines such as rolling mills, and the like, where sudden changes in load and quick reversals are frequent and desirable.

The main objects of my invention are to increase the efficiency of gears of this type, to permit the use of lighter and longer lived gears in machines which are subject to quick reversals or sudden changes of load, and to permit the wearing parts of the gear to be replaced quickly without dismantling the machine in which the gear is used and without removing the body portion of the gear.

In carrying out the objects of my invention I provide a gear made up of a body portion and a concentric ring portion, the ring portion being relatively light and resilient and so mounted with respect to the body portion that a positive driving connection is maintained between the gear portions while at the same time the ring portion is capable of an independent movement bodily transversely to the axis of rotation of the gear. The ring is preferably mounted upon and connected to the body portion by means of a plurality of power transmitting connections, each of said connections including a rotatable member carried by one of the gear portions, preferably the body, and a projecting lug carried by the other of said gear portions, preferably the ring, and slidably mounted on said rotatable member. In the form of my invention hereinafter described, the lugs which are mounted on the ring are normally radial with respect to the axis of rotation, but are so mounted upon and supported by the rotatable members in the body portion that they may assume non-radial positions when pressure transverse to the axis of rotation is applied to the ring.

To render the wearing parts of the gear quickly replaceable I employ a gear made up of a body portion and a segmental ring portion and driving blocks or power transmitting members coupling the adjacent segments of the ring and uniting the body and ring portions.

My invention will be more fully understood by reference to the accompanying drawings, which illustrate the preferred embodiment of the invention.

Fig. 2 is a sectional elevation along the line 2—2 of Fig. 1;

Fig. 3 is a fragmentary side elevation of my improved gear with parts broken away and in section;

Fig. 4 is a perspective of the rotatable member or members forming part of one of the power transmitting connections between the body and ring portions of the gear;

Figs. 5 and 6 are side and end elevations, respectively, of the combined coupling block and driving lug connecting the segments of the ring portion of the gear.

Figure 1:
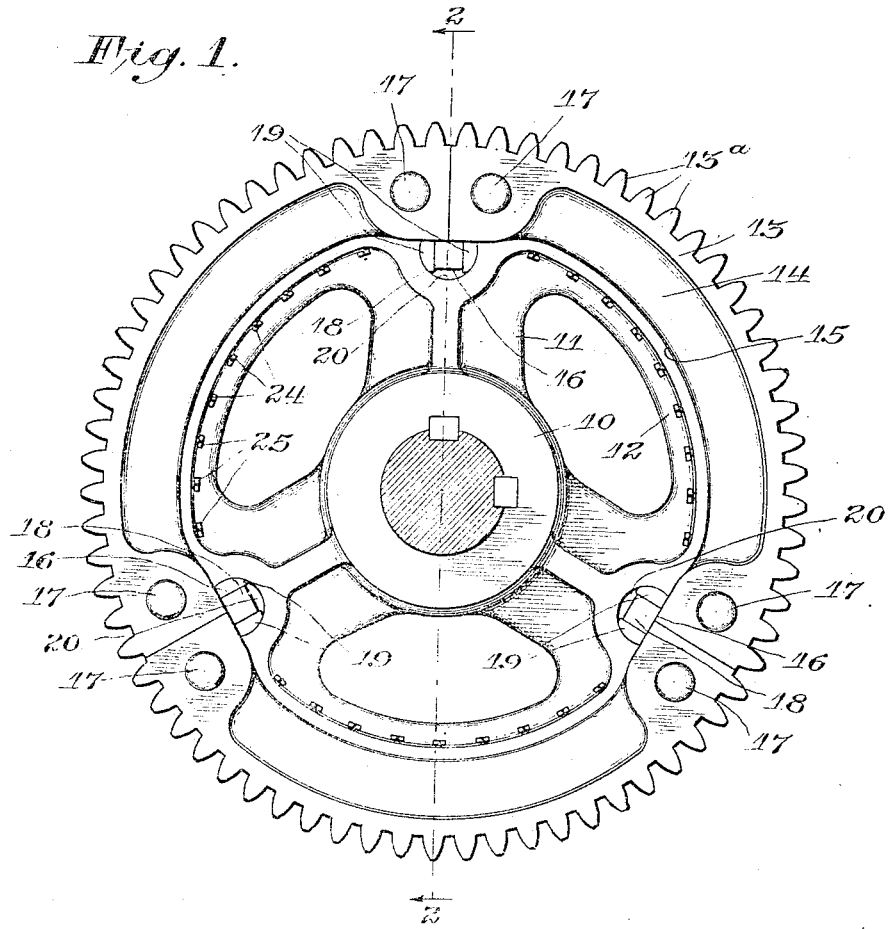
Figure 1 is a side elevation of my improved gear.

My improved gear is made up of a ring portion and a body portion comprising the hub 10, spider 11, and rim 12. The ring portion 13 in the form shown in the drawings is provided with external gear teeth 13$^a$ and with internal flanges 14 which form an annular channel 15. The ring is preferably made up of a plurality of sections, here shown as divided into three 120° segments. The sections of the ring are held together in circular formation by the coupling blocks 16 through the agency of the rivets 17 passing through the blocks 16 and the flanges 14. The ring 13 is relatively resilient. It may be forced, to a limited extent, out of its true circular shape in the operation of the gear under load, but will again assume its normal and proper shape.

The ring 13 is preferably concentric with the body portion but is spaced therefrom primarily by means of the power transmitting connections between the ring and body portions of the gear. Each of said power transmitting connections comprises, in the preferred form shown, a radially projecting lug 18 formed on the coupling block 16 and slidably mounted on a member 19 rotatable in the cylindrical pocket 20 formed in the body member. The rotatable member may be formed of two parts in the manner shown in the figures of the drawings, or may be formed of a single piece merely by means of a web connecting the ends or bottom of the parts. By forming the lug 18 upon the coupling block 16, as shown more clearly in Figs. 5 and 6, I produce a simple and effective combined driving and coupling member which will not only hold the sections of the gear ring in proper position, but will support the entire ring in operative position relatively to the body portion. This driving and coupling member will also support the remaining sections of the gear ring in position when a section (120° segment) is removed by driving out the rivets 17 which fasten that particular section of the ring to the adjacent coupling blocks.

To assist in maintaining the normal circular shape in the ring 13 and to reduce the noise of operation of the gear, I provide in the channel 15 of the ring a layer of sound deadening material 21 and a plurality of radial springs 22. Each spring is provided with a cap 23 and a limiting member or bolt 24, one end of which is fastened to the cap 23 bearing against the material 21 and the other end of which is provided with a head or stop 25. The limiting members 24 pass through openings 26 in the rim 12 and limit the outward movement of the springs 22 by the engagement of the heads 25 with the inner surface of the rim.

The clearance between the ring portion 13 and the body portion of the gear is such that during the period of maximum transverse displacement of the ring relative to the body portion, the teeth of another gear that mesh with the teeth 13$^a$ are permitted to have their outer edges reach the pitch circle of the teeth 13$^a$. By such an arrangement the gears will not be thrown out of mesh although the ring 13 and its gear teeth may move bodily transversely to its axis of rotation away from the gear with which it is in mesh under abnormal conditions of load and at the time of sudden reversals.

When the ring moves bodily relatively to the body portion of the gear in a direction transverse to the axis of rotation of the gear, a combined rotatable and sliding action is produced by the coacting lugs 18 and bearing members 19, the normally radial lugs 18 being permitted to assume non-radial positions by the rotation of the members 19 and to slide upon said members 19 as the resilient segments are flexed or forced out of their normal circular form. The ring and its segments return to normal circular shape when the flexing force is removed.

Furthermore, the springs 22 tend to support the arch formed by a segment of the ring and act freely in opposition to the force tending to flex the ring segment at and near the point where this force is applied. The springs, however, are limited in their effect by the members 24 and are prevented from adding their force to the distorting force on the side of the gear ring opposite the point of application of the distorting force. In other words, the springs and their limiting members tend to resist bending and distortion of the gear ring and thereby tend to relieve stresses on joints and connections. It will be noted that the flanges 14 not only assist in retaining the springs and member 21 in position, but by coacting with rim 12 prevent an axial movement of the ring 13, coupling and driving blocks 16 and rotatable bearing members 19.

While I have shown and described the preferred embodiment of my invention, I do not wish to be limited to this particular form, as changes may readily be made without departing from the spirit and scope of my invention as set forth in the appended claims.

Having thus described my invention, I claim as new and desire to secure by Letters Patent the following:

1. In a gear, a body portion, a ring portion concentric with said body portion but spaced therefrom, said ring portion being formed of sections, and members for coupling adjacent sections, said members also forming the power transmitting connections between the body portion and the ring portion.

2. In a gear, a body portion, a ring portion concentric with said body portion, said ring portion being formed of sections, members for coupling adjacent sections, said members also forming the power transmitting connections between the body portion and the ring portion, and means permitting a movement of said ring portion relative to said body portion transversely to the axis of rotation of the gear.

3. A gear made up of a body portion and a segmental ring portion, the ring portion being spaced from the body portion to permit a relative movement transversely to the axis of rotation of the gear, and means for coupling the adjacent segments of the ring and uniting the members of the gear.

4. A gear made up of a body portion and a segmental ring portion, the ring portion being spaced from the body portion to permit a relative movement transversely to the axis of rotation of the gear, means for coupling the adjacent segments of the ring and uniting the members of the gear, and means for preventing a movement of the ring portion relative to the body portion in a direction parallel to said axis of rotation without interfering with the relative movement transversely to said axis.

5. A gear made up of a body portion and a segmental ring portion, the ring portion being spaced from the body portion to permit a relative movement transversely to the axis of rotation of the gear, and driving connections between segments of the ring portion and the body portion.

6. A gear including a channeled ring formed in segments, and coupling members within the channel of the ring and fastened to the walls of the channel at adjacent ends of adjacent segments.

7. A gear including a toothed internally flanged ring formed in segments, and couplers uniting the adjacent flanged portions to unite the ring segments.

8. A gear including a flanged ring formed in sections, a body portion, and couplers uniting the ring and body portions and uniting the adjacent flanged portions to unite the ring sections.

9. A gear including a flanged ring formed in sections, a body portion, couplers uniting the ring and body portions and uniting the adjacent flanged portions to unite the ring sections, and means permitting a movement of the ring relative to the body portion transversely to the axis of rotation of the gear.

10. In a gear, a body portion, a ring portion concentric with said body portion, three equally spaced power transmitting connections between the body portion and the ring portion, each of said connections including a rotatable member having a normally radially disposed member slidably mounted thereon.

11. In a gear, a body portion, a ring portion concentric with said body portion, a plurality of power transmitting connections between the body portion and the ring portion, each of said connections including a rotatable member having a normally radially disposed member slidably mounted thereon.

12. In a gear, a body portion, a ring portion concentric with said body portion, a plurality of power transmitting connections between the body portion and the ring portion, each of said connections including a rotatable member carried by one of said gear portions, and a projecting lug carried by the other of said gear portions and slidably mounted on said rotatable member whereby said ring portion is permitted to move relative to said body portion transversely to the axis of rotation of the gear.

13. In a gear, a body portion, a ring portion concentric with said body portion, a plurality of power transmitting connections between the body portion and the ring portion, each of said connections including a member rotatably mounted upon the body portion, and a radial lug on said ring, said lug being slidably supported by said rotatably mounted member, whereby when pressure transverse to the axis of rotation is applied to the ring said lugs may assume non-radial positions and the ring be permitted to move transversely to the axis of rotation of the gear.

14. In a gear, a body portion, a ring portion normally concentric therewith, spaced therefrom and capable of a bodily movement relatively thereto in a direction transverse to the axis of rotation of the gear when acted upon by an external force, resilient members located between the ring and body portions, and means permitting said resilient members to oppose said external force on the side of the gear upon which the force is applied but rendering said resilient members ineffective on the opposite side of the gear.

15. In a gear, a body portion, a ring portion normally concentric therewith, spaced therefrom and capable of a bodily movement relatively thereto in a direction transverse to the axis of rotation of the gear when acted upon by an external force, resilient members located between the ring and body portions, and means for limiting the effectiveness of said resilient members.

In testimony whereof I affix my signature.

HENRY A. ALLEN.

Copies of this patent may be obtained for five cents each, by addressing the "Commissioner of Patents, Washington, D. C."